United States Patent
Mourton et al.

(10) Patent No.: US 10,380,918 B2
(45) Date of Patent: Aug. 13, 2019

(54) MODULAR NEEDLE INSERTION TRAINING SYSTEM AND COMPONENTS

(71) Applicant: Mochtech, LLC, Des Peres, MO (US)

(72) Inventors: Robb Mourton, Grover, MO (US); Douglas Churovich, Des Peres, MO (US)

(73) Assignee: Mochtech, LLC, Des Peres, MO (US)

(*) Notice: Subject to any disclaimer, the term of this patent is extended or adjusted under 35 U.S.C. 154(b) by 281 days.

(21) Appl. No.: 15/330,241

(22) PCT Filed: Feb. 26, 2015

(86) PCT No.: PCT/US2015/017772
§ 371 (c)(1),
(2) Date: Aug. 26, 2016

(87) PCT Pub. No.: WO2015/130943
PCT Pub. Date: Sep. 3, 2015

(65) Prior Publication Data
US 2017/0213481 A1    Jul. 27, 2017

Related U.S. Application Data

(60) Provisional application No. 61/945,610, filed on Feb. 27, 2014.

(51) Int. Cl.
*G09B 23/28* (2006.01)
*G09B 9/00* (2006.01)
*G09B 19/00* (2006.01)

(52) U.S. Cl.
CPC ............. *G09B 23/285* (2013.01); *G09B 9/00* (2013.01); *G09B 19/00* (2013.01)

(58) Field of Classification Search
CPC ...... G09B 23/28; G09B 23/285; G09B 23/20; G09B 23/303
USPC ................................ 434/262, 267, 268, 272
See application file for complete search history.

(56) References Cited

U.S. PATENT DOCUMENTS

| | | | | |
|---|---|---|---|---|
| 2,995,832 A * | 8/1961 | Alderson | ................ | A61M 5/00 434/268 |
| 4,198,766 A * | 4/1980 | Camin | ................. | G09B 23/285 434/272 |
| 5,320,537 A * | 6/1994 | Watson | ................... | G09B 23/28 434/272 |
| 8,469,717 B2 * | 6/2013 | Park | ....................... | G09B 23/30 434/268 |

(Continued)

*Primary Examiner* — Kurt Fernstrom
(74) *Attorney, Agent, or Firm* — Sandberg Phoenix & von Gontard PC (57) ABSTRACT

A modular medical training apparatus having a body shaped like an upper torso and configured to house a plurality of self-contained needle insertion training devices. Preferably, the body will house at least one self-contained needle insertion training devices in the forearm of the torso for catheter needle insertions training and at least one in the front upper chest area for needle decompression insertion training. Also disclosed is a readily replaceable simulated vein strip for needle insertion training devices including such components of the modular training apparatus, and a simulated vein with index markings to facilitate length determination for use with needle insertion training devices including such components of the modular training apparatus.

16 Claims, 4 Drawing Sheets

(56) References Cited

U.S. PATENT DOCUMENTS

| | | | | |
|---|---|---|---|---|
| 8,556,634 B2* | 10/2013 | Mourton | ............... | G09B 23/28 |
| | | | | 434/272 |
| 2008/0118902 A1* | 5/2008 | Matsumura | ............ | G09B 23/30 |
| | | | | 434/272 |
| 2013/0078603 A1* | 3/2013 | Yang | .................... | G09B 23/285 |
| | | | | 434/268 |
| 2014/0011172 A1* | 1/2014 | Lowe | ..................... | G09B 23/30 |
| | | | | 434/273 |
| 2014/0017650 A1* | 1/2014 | Romero | ................ | G09B 23/30 |
| | | | | 434/270 |
| 2015/0213733 A1* | 7/2015 | Higgins | ............... | G09B 23/303 |
| | | | | 434/272 |

* cited by examiner

MODULAR NEEDLE INSERTION TRAINING SYSTEM AND COMPONENTS

CROSS REFERENCE TO RELATED APPLICATIONS

This application is the U.S. National Stage of International Application No. PCT/US2015/017772, filed Feb. 26, 2015, which is related to and derives and claims priority from U.S. provisional application 61/945,610 filed 27 Feb. 2014, entitled MODULAR NEEDLE INSERTION TRAINING SYSTEM AND COMPONENTS, which application is incorporated in its entirety herein by reference.

STATEMENT REGARDING FEDERALLY SPONSORED RESEARCH OR DEVELOPMENT

Not applicable.

FIELD

The present teachings generally relate to medical needle insertion training, and more particularly to a modular needle insertion training system and associated components for the same.

BACKGROUND

The statements in this section merely provide background information related to the present disclosure and may not constitute prior art.

Learning the proper skill and precision for safely and effectively inserting a medical needle into a patient can be a difficult and tedious process. Such training becomes more complex and complicated when the training must occur under field conditions, i.e., at locations other than established medical training facilities such as temporary and/or mobile military medical facilities or bases.

Medical personnel whose job responsibilities include performing needle insertions on patients must be trained and certified for that skill set. Those skill sets also require regular practice to maintain proficiency and recertification. In addition, in emergency or military battlefield circumstances, proper (decompression) needle insertion can mean the difference between life and death for an injured patient. That is, proper and effective needle insertion training can prepare a medical responder to timely and properly treat the two leading causes of preventable death in a traumatic emergency: (i) administration of intravenous fluids for loss of blood, dehydration and shock; and (ii) needle decompression for relief of tension pneumo-thorax (collapsing lung). Consequently, in addition to benefitting medical personnel in routine intravenous needle procedures, ongoing training and practice of proper needle insertion training techniques by emergency responders and troops is therefore critically important.

Traditional medical needle insertion training devices are designed for classroom settings. They typically include a replicated human body part (e.g., a leg, arm or torso), and focus on anatomical correctness—not convenience. Most require support components (e.g., pumps and monitors) that link to the anatomical component with tubes and wires. Moreover, all of the training components require separate storage—even the needles (a/k/a "Sharps"). Hence, traditional training devices are large and unwieldy, not very durable, and not very portable. Up to recently, the prevailing attitude in the medical community had been that the student would learn and practice needle insertion techniques at an institution or facility supplied with a traditional training device. As a consequence, training, certification and recertification efforts have been traditionally focused on classroom training, with few options for home or other out-of-classroom practice.

Recently a few "portable" or "personal" devices have been introduced, including for example the self-contained needle insertion training system disclosed in U.S. Pat. No. 8,556,634 (the "'634 Patent"). Such training systems are stand-alone devices that are not designed for use in conjunction with a traditional classroom training system. It would be desirable to have a traditional classroom needle insertion training system that incorporates portable or take-home training components that are designed for cooperative use with the classroom system.

Moreover, needle insertion training devices all utilize synthetic veins, generally in the form of rolls of surgical tubing, to simulate veins and arteries. These veins need regular and routine replacement during training as the procedures necessitate repeated puncturing of the tubing. The synthetic vein is traditionally replaced in one of two ways. If the training device is designed to hold specific lengths of tubing, a replacement length of tubing is drawn from a spool or roll of tubing and cut to size, then clamped or otherwise held in place for training purposes. If the training device is designed to secure a portion of a spool or roll of tubing, additional length of tubing is drawn from the spool or roll and secured to the training device for use, while the damaged section is cut off. This procedure can be tedious and time consuming, and is further complicated when it is desired to train with simulated blood in the vein. Traditionally, this is accomplished by using a syringe to fill a section of tubing with simulated blood. The length of tubing must be the proper length, secured at one end, and must be secured at the other end once filled with fluid. It would therefore be desirable to have synthetic veins or a synthetic vein system that allows for easy replacement of the synthetic veins for needle insertion training systems.

As will become evident in this disclosure, the present invention provides benefits over the existing art.

BRIEF DESCRIPTION OF THE DRAWINGS

The illustrative embodiments of the present invention are shown in the following drawings which form a part of the specification. The drawings described herein are for illustration purposes only and are not intended to limit the scope of the present teachings in any way.

Corresponding reference numerals indicate corresponding parts throughout the several views of drawings.

DETAILED DESCRIPTION

The following description is merely representative in nature and is not intended to limit the present disclosure or the disclosure's applications or uses. Before turning to the figures and the various representative embodiments illustrated therein, a detailed overview of various embodiments and aspects is provided for purposes of breadth of scope, context, clarity, and completeness.

Further areas of applicability of the present teachings will become apparent from the description provided herein. It should be understood that the description and specific examples are intended for purposes of illustration only and are not intended to limit the scope of the present teachings.

As described and disclosed herein are improvements to embodiments of a self-contained needle insertion training system, such as disclosed in the '634 Patent, which disclosure is incorporated by reference herein. In various embodiments, the system of the '634 Patent includes a hollow body having at least one sidewall, a closed end, an opposing open end and an interior chamber. The training system of the '634 Patent additionally includes a closure device structured and operable to mate with the open end to close the interior chamber and a simulated cardiovascular vein or artery disposed along an outer surface of the sidewall, wherein the interior chamber provides a storage space for medical devices to be used in association with the training system.

Figure 1:
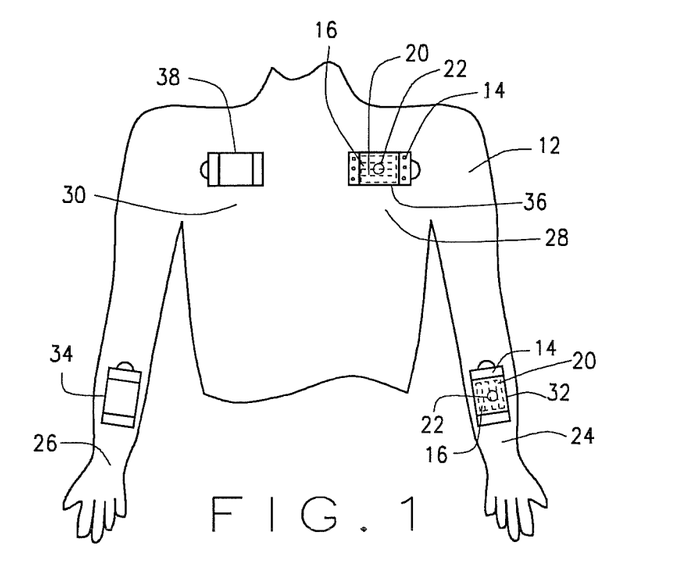
FIG. 1 is a plan view of a medical procedure training mannequin in the shape of a human upper torso having a plurality of recesses, each recess configured to removably receive a self-contained needle insertion training device, the mannequin depicted as housing two self-contained needle insertion training devices in two of the plurality of recesses, in accordance with various embodiments of the present disclosure.

Referring now to FIG. 1, the present disclosure provides a modular training system 10 that comprises a simulated human upper torso 12 and two interchangeable self-contained needle insertion training devices 14 adapted for independent use, such as for example the training system of '634 Patent, and that may be used in conjunction with the torso 12. Preferably, each training device 14 is substantially cylindrical, smaller in circumference than a human forearm, and less than one half the length of a human forearm. The training devices 14 allow for training of needle decompression insertion technique and catheterized needle insertion techniques. Both techniques are practiced on the surface of the training device 14 within a training region 16 depicted generally in FIG. 1 with dashed lines.

Preferably, the training devices 14 will have a training region 16 common to both needle insertion training disciplines. However, it is contemplated that for some configurations of the training device 14, there may be more than one training region 16. For needle insertion training, the training device has a plurality of simulated veins 20 running along the length of the outer surface of the device that can be used to facilitate the insertion of medical needles during training procedures. For needle decompression insertion training, the training device 14 has an orifice 22 positioned generally in the center of the veins 20, with the area in and about the orifice 22 comprising material constructed to replicate inter-rib flesh.

The torso 12 has a first forearm 24, a second forearm 26 a front left upper chest region 28 and a front right upper chest region 30. The torso 12 also has four contoured recesses 32, 34, 36 and 38 positioned on the front side of the outer surface of the torso 12. The recess 32 is positioned at the proximal end of the forearm 24 near the elbow, and the recess 34 is positioned at the proximal end of the forearm 26 near the elbow. These recesses 32 and 34 are located near the elbow to correspond to the traditional primary location for intravenous needle insertion. The recess 36 is positioned in the front left upper chest region 28, and the recess 38 is positioned in the front right upper chest region 30. These recesses 36 and 38 are located at the area of the torso 12 corresponding to the primary location for needle decompression insertion between two ribs in the upper chest area, and preferably between the second and third ribs.

The recesses 32, 34, 36 and 38 are each configured to snugly, yet releasably receive and securely hold one of the training devices 14 in a fixed position within the recess. While the training devices 14 are depicted by preference as cylindrical, it is contemplated that the training devices 14 may be of a wide variety of other shapes and sizes, so long as the training devices 14 are configured to fit within at least one of the recesses 32, 34, 36 or 38 in a position that allows a user to practice needle insertion techniques when so positioned.

The recesses 32, 34, 36 and 38 are further configured to position and orient the training devices 14 within the torso 12 for relative anatomical accuracy. That is, the recess 32 is configured to hold the training device 14 within the recess 32 in a stable manner such that the training region 16 is readily accessible to a user practicing catheterized needle insertion techniques on the training device 14 when the training device 14 is properly positioned in the recess 32. Moreover, the recess 32 is configured to receive the side of the training device 14 opposite the training region 16 in such a position that at least one of the simulated veins 20 in the training region 16 runs along a path within the training region 16 relative to the forearm 24 to substantially replicate the location and orientation of a natural vein near the surface of a forearm were the forearm 24 to be a natural forearm. The recess 34 is likewise configured.

Similarly, the recess 36 is configured hold one of the training devices 14 within the recess 36 in a stable manner such that the training region 16 is readily accessible to a user practicing needle decompression insertion techniques on the training device 14 when the training device 14 is properly positioned in the recess 36. Moreover, the recess 36 is configured to receive the side of the training device 14 opposite the training region 16 in such a position that the orifice 22 within the training region 16 is positioned relative to the front left upper chest area 28 to substantially replicate the location and orientation of natural inter-rib tissue between the second and third ribs in the front left upper chest area 28 were the chest area 28 to be natural. The recess 38 is likewise configured.

Depending upon the shape and configuration of the training devices 14 and the orientation of their training regions 20, the various recesses 32, 34, 36 and 38 on the torso 12 may have differing contours and depths to accommodate accurate positioning of the devices 14 in each recess 20 to best mimic anatomical accuracy for training purposes.

Of course, there may be more than one configuration of the training devices 14 for a training system 10. Accordingly, it is contemplated that the system 10 may have multiple configurations for the recesses 32, 34, 36 and 38. For example, one of the recesses 32, 34, 36 and 38 may have contours specifically configured to match and mate with corresponding contours of a particular training device 14a (not shown). Alternately, by way of another example, the contours of one of the recesses 32, 34, 36 and 38, for example the recess 32, may be configured to simultaneously match and mate with any of two or more training devices 14a-14n (not shown) with each such training device 14a-14n having a different shape and/or size. The recess 32 in such an embodiment would therefore be universal to the multiple configurations of training devices 14a-14n. It is further contemplated that for one configuration of the modular training system 10, all of the recesses 32, 34, 36 and 38 may be of uniform shape and size. In this way, a single training device 14 can be placed into any of the recesses 32, 34, 36 and 38 on the torso 12 for such a configuration. In yet another alternate configuration of the modular training system 10, at least two of the recesses 32, 34, 36 and 38 are of different shapes and/or sizes such that each is configured to snugly, yet releasably, receive and secure a different size or shape training device 14a and 14b (not shown). As a result, this embodiment of the torso 12 can accommodate more than one variety of training device 14, such as for example, a training device 14a positioned in recess 36 located at the upper left chest area 28 of the torso 12 that is specifically adapted for needle decompression training, and a training device 14b of different shape and/or size than the training device 14a, positioned in recess 32 located at the left forearm of the torso 12 that is specifically adapted for catheter needle insertion training.

Moreover, the modular training system 10 is not limited to having exactly four recesses such as the recesses 32, 34, 36 and 38. Rather, the system 10 may be configured to have any number of recesses, or may have as few as one recess such as for example the recess 32 positioned on the forearm 24, or for example the recess 36 positioned on the front left upper chest area 28.

Figures 2, 3, 4:
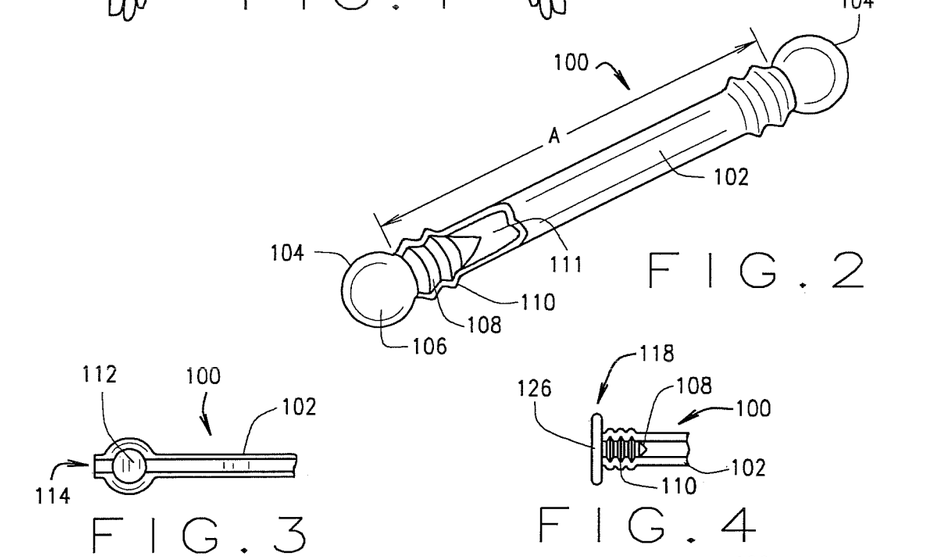
FIG. 2 is a perspective view of a replaceable simulated cardiovascular vein strip having its opposing ends sealed by inserted plugs with bulbous heads, with one end shown in partial cutaway, in accordance with various embodiments of the present disclosure.
FIG. 3 is a cutaway view of a portion of a replaceable simulated cardiovascular vein strip having an end sealed by an inserted sphere, in accordance with various embodiments of the present disclosure.
FIG. 4 is a cutaway view of a portion of a replaceable simulated cardiovascular vein strip having an end sealed by an inserted plug with a T-shaped head, in accordance with various embodiments of the present disclosure.
Figure 5:
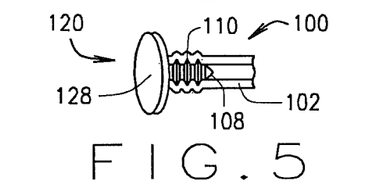
FIG. 5 is a cutaway view of a portion of a replaceable simulated cardiovascular vein strip having an end sealed by an inserted plug with a button head, in accordance with various embodiments of the present disclosure.

Referring now to FIG. 2, the present disclosure provides a simulated cardiovascular vein strip 100 that comprises a relatively small diameter elastic tube 102 of a predetermined central length A and a pair of plugs 104 fitted into each end of the tube 102 to seal the tube 102 to prevent leakage of fluids from out of the tube 102, thereby forming a self-contained encapsulated unit. The tube 102 is preferably constructed of an elastic material, such as for example latex, rubber or other similar suitable elastomeric material, sized and structured to simulate the feel, density, thickness and pliability of a natural cardiovascular vein. If it is desired to practice on a vein of a particular known outer diameter, wall thickness or elasticity, such as for example the vein of an infant as opposed to that of an adult, then the dimensions of and materials used to construct the tube 102 can be selected to provide as close approximation as possible. Each of the plugs 104 has an enlarged generally spherical head 106 with a pointed protrusion or finger 108 extending a short distance from the head 106. A set of parallel, radial ridges 110 encircle the finger 108.

The finger 108 has an outer diameter that is greater than the inner diameter of the tube 102. In this way, the elastic tube 102 must be stretched to fit over the finger 108 and the ridges 110 when the plug 104 is inserted into the end of the tube 102. The ridges 110 help to grasp the inner surface of the tube 102 and thereby retain the plug 104 in the tube 102. When assembled to form the vein strip 100, the tube 102 and plugs 104 create a sealed cavity 111 within the vein strip 100. The fingers 108 and ridges 110 are shaped and sized to require the tube 102 to be stretched sufficiently to not only seal the tube 102 with the plugs 104, but to allow the tube 102 to be stretched again thereafter by a predetermined amount and still retain the seal without rupturing or opening the cavity 111. While the cavity 111 may contain air or some other gas in some embodiments, in other embodiments the cavity 111 may contain a liquid, such as for example a colored saline solution, to simulate a bodily fluid such as blood. Moreover, the gas or liquid may be contained in the cavity 111 at a wide range of pressures, limited only by the construction and material properties of the vein strip 100.

As can be appreciated, the vein strip 100 can be configured with a variety of features for particular applications or for the practice and training of certain insertion techniques. These include, for example, a configuration adapted for use with a particular needle insertion training device model; the tube 102 being empty inside; the tube 102 having fluid inside; and/or the tube 102 having a particular outer diameter, a particular wall thickness, a particular material toughness; and/or a particular length. In order to enable a user to more readily determine the model or type of simulated vein strip 100, the vein strips 100 can be color coded with one or more colors on at least part of the vein strip 100 such that each of said one or more colors corresponds to one or more of the particular features of the simulated vein.

Figure 6:
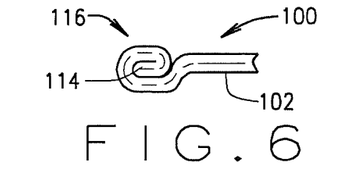
FIG. 6 is a plan view of a portion of a replaceable simulated cardiovascular vein strip having an end folded and held fast to form an enlarged sealed head, in accordance with various embodiments of the present disclosure.
Figure 7:
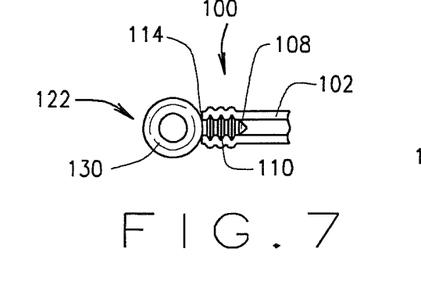
FIG. 7 is a cutaway view of a portion of a replaceable simulated cardiovascular vein strip having an end sealed by an inserted plug with an enlarged eyelet head, in accordance with various embodiments of the present disclosure.
Figure 8:
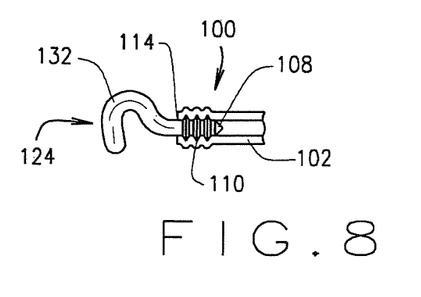
FIG. 8 is a cutaway view of a portion of a replaceable simulated cardiovascular vein strip having an end sealed by an inserted plug with a hook-shaped head, in accordance with various embodiments of the present disclosure.

FIGS. 3-8 disclose a variety of configurations of one end of the vein strip 100. FIG. 3 discloses a relatively small, generally spherical ball or bead 112 that has been forced into the end 114 of the vein strip 100 to seal the end 114. The bead 112 is sized such that the elastic tube 102 must be stretched to fit over the bead 112 when inserted into the end 114 of the tube 102. FIG. 6 discloses a configuration of the vein strip 100 in which there is no plug to seal the end 114, but rather the end 114 of the tube 102 is rolled into an enlarged head 116 that is processed with one or more treatments such as for example, heat, chemical treatment and/or application of an adhesive, to enlarge and seal the end 114.

FIGS. 4, 5, 7 and 8 disclose several different configurations of plugs 118, 120, 122 and 124 with heads 126, 128, 130 and 132, respectively, for the vein strip 100. These are shown by way of example. The exact configuration of each of the plugs such as depicted at 104, 112, 118, 120, 122 and 124, may differ so long as the configuration seals the tube 102 and enables the vein strip to function as outlined herein.

Each of the plugs 118, 120, 122 and 124 has a pointed protrusion or finger 108 extending a short distance from the head, with a set of parallel, radial ridges 110 that encircle the finger 108. The head 126 is an extended cylindrical cross-brace head that attaches to the finger 108 near the center of the head 126. The head 128 is button or disc-shaped with the finger 108 extending in a perpendicular manner from the center of the head 128. The head 130 is shaped to form a closed loop or eyelet with the finger 108 extending from one side of the loop or eyelet. The head 132 is shaped to form an open ended hook with the finger 108 extending from the shank of the hook.

The vein strip 100 may be used as a component for a needle insertion training device having attachment devices to hold the vein strip 100 in place during practice or training. Such devices are structured and operable to provide an instrument or tool for users to practice various medical needle insertion techniques. For example, FIGS. 10-15 disclose various configurations of a novel self-contained needle insertion training device that are each specifically adapted to utilize the vein strips 100.

Figures 10, 11:
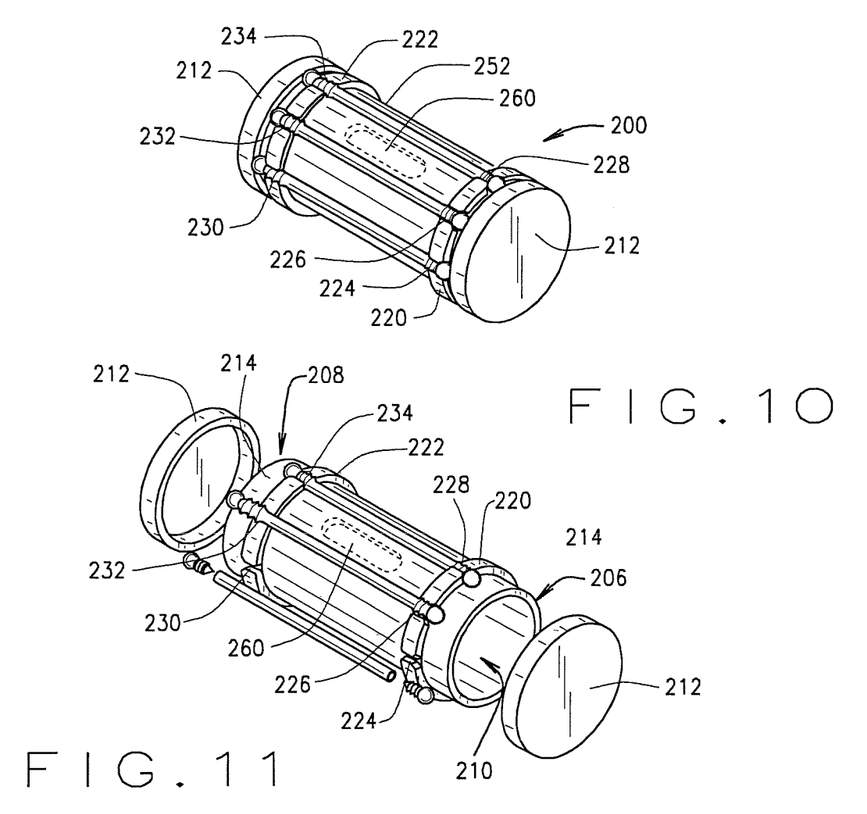
FIG. 10 is a perspective view of a self-contained needle insertion training device configured to hold a plurality of the vein strips of FIGS. 2-6 positioned along the outer surface of the device, in accordance with various embodiments of the present disclosure.
FIG. 11 is an exploded view of the self-contained needle insertion training device of FIG. 10, having a closure device and a plurality of the vein strips of FIG. 2 separated from the body of the device, in accordance with various embodiments of the present disclosure.
Figure 12:
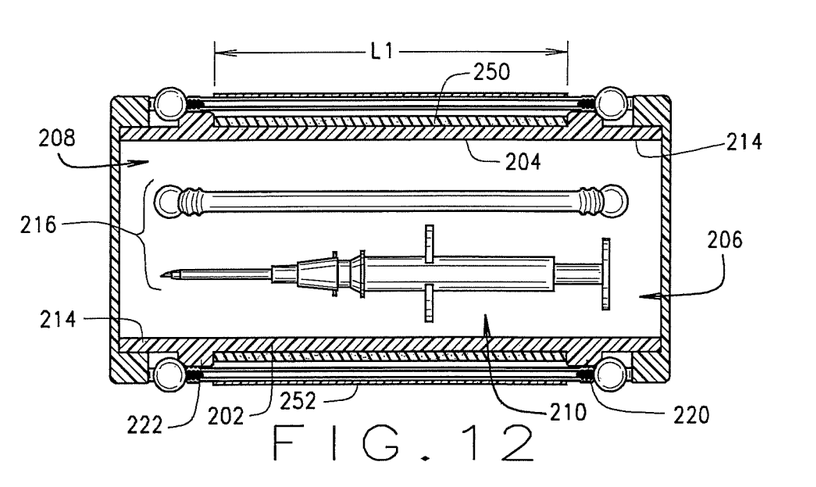
FIG. 12 is a cross-sectional view of the self-contained needle insertion training device of FIG. 10, containing in its interior a set of medical implements for use in needle insertion training using the device, in accordance with various embodiments of the present disclosure.

FIGS. 10-12 depict a first embodiment of a self-contained needle insertion training device 200. The training device 200 includes a hollow tubular body 202 having at least one sidewall 204, and two opposing open ends 206 and 208. Generally, a self-contained needle insertion training device such as for example the training device 200, provides expedient and precise skills training for various medical needle insertion techniques, including for example, intravenous ("IV"), intramuscular, subcutaneous and needle decompression. By way of further example, the training device 200 is structured and functional to be a total self-contained training device, whereby everything that is needed to conduct critical hands on needle insertion training can be stored within the unit. Preferably, the training device 200 is approximately two to three inches in diameter and approximately six inches long. In particular, the body 202 can be sized to approximate the average size of a human forearm or wrist such that the training device 200 can be securely held and stabilized with one hand of the user, leaving the user's other hand free to practice needle insertion techniques described herein. However, the training device 200 is not limited to these diameters and lengths, and may have differing dimensions as may be desired and reasonably practical.

Further, the training device 200 may be constructed in a wide variety of configurations other than the generally tubular configuration of FIGS. 10-12. For example, the training device 200 may for example be box-shaped, oval, hexagonal or polygonal. It is envisioned that the training device 200 can be used, for example, in the field by military forces to instruct critical combat lifesaving skills to soldiers and host nation forces, as well as providing an excellent commercial training tool for personal use as well as in the classroom setting, and may be used as a component in conjunction with the modular system 10.

Although the body 202 of the training device 200 can include one or more sidewalls 204, for clarity and simplicity, the body 202 will be described herein as including a single cylindrical sidewall 204. That is, in various embodiments, the body 202 may have a square, rectangular, triangular, etc., cross-section, such that the body 202 includes a plurality of sidewalls 204, or in various other embodiments, the body 202 can have a circular, oval, elliptical, etc., cross-section, such that the body 202 includes a single circumferential sidewall 204. However, for simplicity and clarity, the sidewall(s) 204 will be referred to herein in the singular, e.g., sidewall 204.

Figure 14:
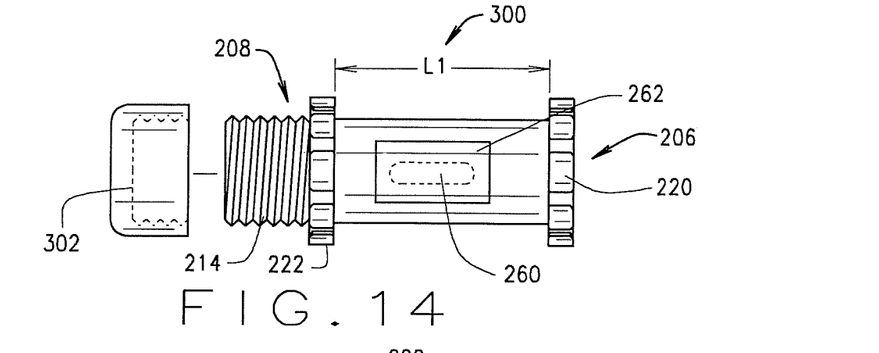
FIG. 14 is a plan view of the body of an alternate embodiment of the self-contained needle insertion training device configured to hold a plurality of the vein strips of FIGS. 2-6, in accordance with various embodiments of the present disclosure.

The training device 200 additionally includes a pair of closure devices 212 that are structured and operable to engage or mate with the open ends 204 and 206 of the body 202 to form an enclosed interior cavity or chamber 210 within the sidewall 204 such that one or more medical implements 211 for use in association with the training device 200, can be removably stored within the interior chamber 210. (See FIG. 12). The closure devices 212 can assume a wide variety of commonly recognized configuration, such as for example the endcaps as depicted in FIGS. 10-12 or a threaded endcap as depicted in FIG. 14.

The one or more medical implements 211 can be any mechanism, substance, applicator, accessory, component, tablet, capsule, caplet, etc. to be used in association with the training device 200, e.g., a vein strip 100, a hypodermic syringe and associated needle assemblies, an intravenous catheter device and associated needle assemblies, decompression device and associated needle assemblies for evacuating air from a wound, alcohol or iodine swaps, scissors, a knife, tweezers, injectable medications, oral medications, a suture kit, etc.

The training device 200 includes annular collars 214 that are fixed to each end of the body 202 to provide the open ends 206 and 208 that are matable with the closure devices 212. In other embodiments, the open ends 206 and/or 208 can be configured to removably mate with the closure device 212 without an annular collar 214. That is, while the closure devices 212 are depicted in FIGS. 10-15 as either threaded or unthreaded endcaps, closure devices 212 can be configured for example as plugs that press fit into the openings 206 and 208 or threaded plugs that screw into the openings 206 and 208. Further, the closure devices 212 can have a variety of configurations to facilitate the opening and closing of the closure devices 212 onto the body 200. For example, the closure devices 212 can include a protrusion configured in any number of readily understood configurations to provide a reasonable shape and surface to grip the closure devices 212 for such opening and closing. As another example, the closure devices 212 can be configured as a cap having a knurled outer surface with no square protrusion, where the knurled outer surface provides a grip to enable the opening and closing of the training device 200 with the closure devices 212. Alternatively, in various embodiments, the closure device 212 can be any one or more of a lid, door or any other similar structure, device or mechanism that is pivotally, rotatingly or hingedly connected to the body 200 at or near the open ends 206 and/or 208 such that the structure, device or mechanism can be secured in a closed position, via any suitable latching device, and pivotally, rotatingly or hingedly moved to an open position upon release or uncoupling of the latching device.

Hence, the one or more medical implements 211 for use with the training device 200 can be placed in the interior chamber 210 and stored therein by placing the closure devices 212 in a closed position, wherein the closure devices 212 securely engage the annular rings 214 of the body 202 at or near the open ends 206 and 208 as shown. Subsequently, the one or more medical implements 211 can be removed from the interior chamber 210 by placing the closure devices 212 in an open position, wherein the closure devices 212 are disengaged from the annular rings 214 at the open ends 206 and/or 208, i.e., removed from or moved away from the body open ends 206 and/or 208, thereby allowing access to the interior chamber 210.

With further reference to FIGS. 10-12, the training device 200 includes a pair of parallel annular rings 220 and 222, each having a generally square cross-section and extending radially from the outer surface of the body 202 near the ends 206 and 208, respectively. Each of the rings 220 and 222 are approximately one quarter inch tall and one quarter inch across. Of course, these dimensions of the rings 220 and 222, as well as their cross-sectional shapes, can vary substantially to accommodate the functions of the rings 220 and 222 as explained herein. The ring 220 has three parallel open necks 224, 226 and 228 formed in and spanning across the ring 220. The necks 224, 226 and 228 are generally spaced equidistant from each other approximately one inch apart along an arc of the ring 220. Likewise, the ring 222 has three corresponding parallel open necks 230, 232 and 234 formed in and spanning across the ring 222. The necks 230, 232 and 234 are generally spaced equidistant from each other approximately one inch apart along an arc of the ring 222, and are oriented such that the neck 230 aligns with the neck 224, the neck 232 aligns with the neck 226, and the neck 234 aligns with the neck 228 across the length of the outer surface of the body 202 there between. Because the rings 220 and 222 are parallel to each other, the necks 224, 226 and 228 of the ring 220 are all equidistant from their corresponding necks 230, 232 and 234 of the ring 222.

Figure 13:
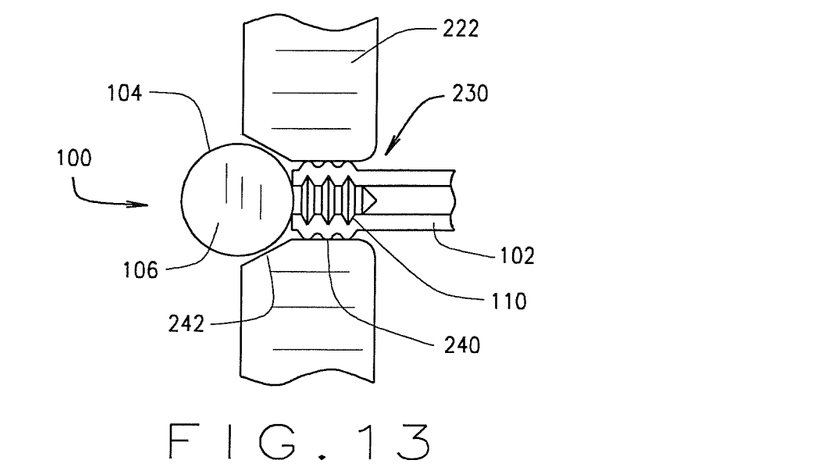
FIG. 13 is a plan view of one of the vein strip attachment necks of the self-contained needle insertion training device of FIG. 10, with a vein strip positioned in the neck.

Referring to FIG. 13, which depicts a representative cross-section of each of the necks 224, 226, 228, 230, 232 and 234, it can be seen that the necks each have a narrow channel 240 that collinearly opens into a beveled portion 242. The necks are configured such that the beveled portions 242 of each of the corresponding pairs of necks 230 and 224, 232 and 226, and 234 and 228, face away from each other. As can be seen in FIGS. 10 and 11, and in detail in FIG. 13, the necks 224, 226, 228, 230, 232 and 234 are each sized to releasably receive one end of a correspondingly sized vein strip 100, with the beveled portion 242 configured to cradle the head 106 of the plug 104 while the channel 240 is configured to receive the finger 108 and surrounding portion of the tube 102. Notably, the channel 240 is too small to allow the head 106 to pass entirely through the channel 240. In this way, a vein strip 100 can be secured along the outer surface of the training device 200 by, for example, placing the tube 102 in the channel 240 of the neck 230; pulling the plug 104 into the neck 230 such that the head 106 abuts the beveled portion 242; stretching the vein strip 100 along the length of the body 202 of the training device 200 in the direction of the neck 224 (corresponding to the neck 230) so as to stretch the tube 102 and pull the opposite end of the vein strip 100 beyond the neck 224; placing the portion of the tube 102 nearest the neck 224 into the channel 240 of the neck 224; and allowing the elastic tube 102 to retract or pull the second plug 104 into engagement with the beveled portion 242 of the neck 224. Each of the pairs of necks 230 and 224, 232 and 226, and 234 and 228 are thereby configured to receive and secure a correspondingly sized vein strip 100 in this manner. (See FIGS. 10-12). Of course, the exact configuration of the necks 224, 226, 228, 230, 232 and 234 may differ so long as the configuration allows the tube 102 of the vein strip 100 to pass fully through the neck while not allowing the head 104 to pass fully through.

As can be appreciated, then, the training device 200 is thereby configured to hold one or more simulated cardiovascular vein strips 100 disposed along an outer surface of the body sidewall 204 as seen in FIGS. 10 an 11. As can also be appreciated, appropriate vein strips 100 will have a length A (FIG. 2) that is slightly shorter than the perpendicular distance L1 between the rings 220 and 222 (FIG. 12) such that when it is desired to secure a vein strip 100 to the side of the training device 200, the tube 102 must be stretched so that the plugs 104 can be positioned in the beveled portions 242 of a pair of corresponding necks, such as for example the necks 226 and 230, while retaining an amount of tension in the tube 102 after the plugs 104 have been so positioned. The remaining tension acts to hold the vein strip 100 in position stretched between the rings 220 and 222. Further, it will be understood that the configuration of the necks 224, 226, 228, 230, 232 and 234 will accommodate releasably receiving and retaining vein strips 100 having any of the configurations depicted in FIGS. 3-6 and possibly 8. Accordingly, the portion of each simulated cardiovascular vein strip 100 disposed along the outside of the outer surface of the body sidewall 202 is accessible by the user for use in practicing the proper technique of inserting a catheter intravenous needle into an actual human cardiovascular vein, as described herein.

In addition, other components can be added to the training device 200 to provide more anatomical accuracy. For example, as can be seen in FIGS. 10-12, a spongy simulated flesh pad 250 can be placed under the vein strips 100 to simulate the flesh over which surface cardiovascular veins are positioned. That is, the flesh pad 250 is structured and functional to simulate the density and pliability of human flesh adjacent, for example, the cardiovascular veins in a human forearm or hand. More particularly, the flesh pad 250 is preferably constructed of an elastic material and configured in a generally tubular shape, or can be secured in a tubular shape, having dimensions such that the flesh pad 250 extends from the ring 220 to the ring 222 about the center of the body 202, and can be slightly stretched over the rings 220 and 222 to fit snugly there between. By further example, as shown in FIG. 12, a simulated skin patch 252 can be placed over the vein strips 100. The simulated skin patch 252 is structured and functional to simulate the density and pliability of human skin adjacent the cardiovascular veins in a human forearm or hand. Again, the skin patch 252 is preferably constructed of an elastic material and configured in a generally tubular shape, or can be secured in a tubular shape, having dimensions such that the skin patch 252 extends from the ring 220 to the ring 222 about the center of the body 202, and can be slightly stretched over the rings 220 and 222 to fit snugly there between.

Further, as depicted in FIGS. 10-11, the training device 200 may also have needle decompression training orifice, such as the slot 260, formed in and extending through the side of the body 202. The needle decompression training slot 260 is structured and functional to allow a user to practice inserting a decompression needle into the chest of a patient to evacuate air from the patient's chest cavity. In various embodiments, a clavicle subtissue simulation pad 262 is positioned on the outer surface of the body 202 atop the needle decompression training slot 260. The clavicle subtissue simulation pad 262 is structured to simulate the feel, density, thickness and pliability of human clavicle tissue. Preferably, the slot 260 has the shape of a slot and is positioned substantially equidistant from each of the rings 220 and 222, and between the pair of necks 226 and 232 and the pair of necks 228 and 234 such that when vein strips 100 are positioned between the necks 226 and 232 and the necks 228 and 234 as explained above, the vein strips 100 act as a pair of simulated ribs of a torso-skeletal structure for purposes of needle decompression training using the slot 260 there between.

Still further, in various embodiments, the training device 200 can include an inflatable air sack (not shown) structured and operable to be inflated and placed into the interior storage chamber 210 adjacent the needle decompression training slot 260. Therefore, if a user properly inserts a decompression needle into the needle decompression training slot 260, simulating proper insertion of the needle into the chest cavity of a patient, the air sack will be pierced and the air can be evacuated via the decompression needle.

In another embodiment of the unique training device of the present disclosure, FIG. 14 depicts a training device 300 that has been modified from the training device 200 such that the end 206 is closed with no annular ring 214 at the end 206, and the annular ring 214 at the open end 208 is threaded on its outer surface so as to mate with a threaded end cap 302 to enable the releasable closing of the cavity 210 within the training device 300.

Figure 15:
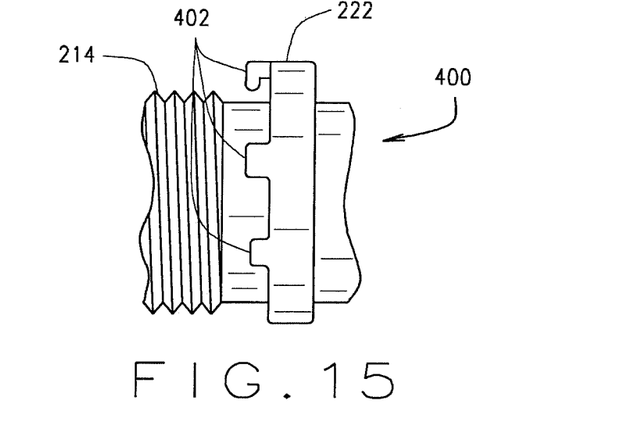
FIG. 15 is a plan view of one end of the body of an alternate self-contained needle insertion training device configured to hold a plurality of the vein strips of FIG. 7, in accordance with various embodiments of the present disclosure.

In yet another embodiment of the unique training device of the present disclosure, FIG. 15 depicts a portion of a training device 400 that has been modified from the training device 200 such that the annular ring 214 at the open end 208 is threaded on its outer surface so as to mate with a threaded end cap 302 (as depicted in FIG. 14) to enable the releasable closing of the cavity 210 within the training device 400. Further, instead of having the necks 230, 232 and 234 formed in the annular ring 222, the training device 400 has a set of three hooks 402 formed in the annular ring 222 that each extend in a generally perpendicular fashion away from the ring 220 and curve downward toward the annular ring 214 of the training device 400.

Of course, the vein strips 100 may be used with other needle insertion training devices beyond those that are self-contained, so long as the training device is configured to releasably receive and hold at least one vein strip 100 in a position on the device that facilitates use of the vein strip 100 for needle insertion training as explained herein.

Figure 16:
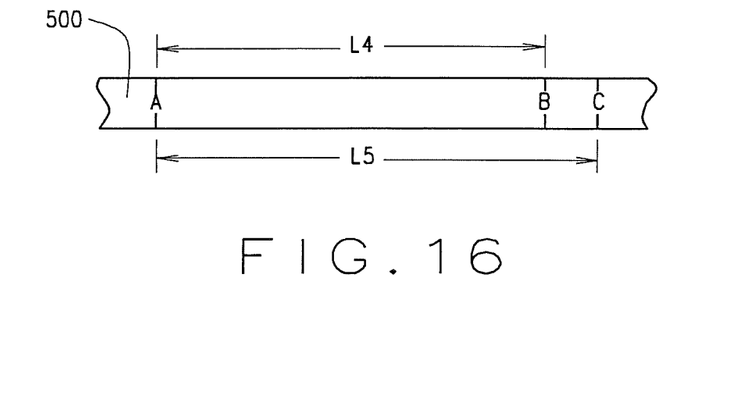
FIG. 16 is a plan view of a portion of simulated cardiovascular vein tubing having index marks or markings for a plurality of predetermined cut and mount lengths, in accordance with various embodiments of the present disclosure.

FIG. 16 depicts a portion of simulated cardiovascular vein tubing 500 having a first index mark A positioned at a desired location along the length of the tubing 500. A second index mark B is positioned at a predetermined distance L4 from the first index mark A along the length of the portion 500. Similarly, a third index mark C is positioned at a predetermined distance L5 from the first index mark A along the length of the portion 500. For a needle insertion training device that requires the user to cut or otherwise mount specific lengths of a portion of simulated vein tubing, such as for example, the portion 500, to accommodate such training devices, the index marks A, B and C are used to identify particular lengths, for example L4 and L5, that are the lengths required by such a training device. In this way, a roll or other portion of simulated cardiovascular vein tubing, such as for example the portion 500, can be labeled with a variety of index marks that enable the ready and rapid cutting or mounting of the desired length of simulated vein tubing for more than one needle insertion training device having different tube length requirements. Alternatively, the lengths L4 and L5 can denote alternate lengths for the same training device so as to allow the mounting of lengths of vein tubing with differing tensions to simulate, for example, either static or rolling veins for such training device.

Figure 9:
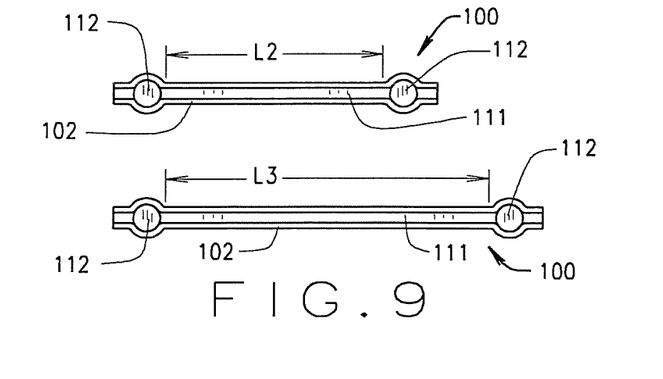
FIG. 9 is a plan view of a pair of vein strips of FIG. 2 having different predetermined lengths, in accordance with other various embodiments of the present disclosure.

Moreover, as shown in FIG. 9, the vein strip 100 may be constructed to have any predetermined central length, for example a central length L2 or a central length L3. In this way, each vein strip 100 can be tailored to fit a particular pair of attachment points, such as for example the paired necks 224 and 230. That is, the vein strip 100 having a shorter length of L2 will fit a training device configured with a shorter length L1 between the annular rings 214 (see FIG. 12), while the vein strip 100 having the longer length of L3 will fit a training device configured with a longer distance L1 between the annular rings 214 (see FIG. 12). Alternatively, multiple vein strips 100 having the differing lengths, such as for example the different lengths L2 and L3, can be sized for use on the particular pair of attachment points of the same training device so as to impart different tension levels in the tubes 102 to selectively simulate different types of veins on the training device, including for example, either static or rolling veins.

Operation and use of the training device 200 (or alternately the training devices 300 or 400) will now be described. First, the training device 200 can be utilized to simulate dry intravenous needle insertion. For example, in various embodiments, one or more of the simulated cardiovascular vein strips 100 of the training device 200 can be utilized to practice inserting an IV needle and advancing an associated catheter into the tube 102 of a vein strip 100. To perform such a dry intravenous needle insertion training procedure utilizing the training device 200, the user places one of the closure device 212 in the open position and removes the desired medical implement 211, e.g., an 18-gauge catheter needle, and an appropriately sized custom vein strip 100 having no fluid in its tube 102, from the interior chamber 210. Of course, the desired items may be located elsewhere other than in the chamber 210 at the option of the user.

The user may then replace the closure device 212 about the annular ring 206 or 208 to close the training device 200. The user will then complete a pre-execution check of the IV supplies, e.g., the 18 gauge catheter needle and the dry vein strip 100 and simulated skin patch 252, to ensure good serviceability. Next, the user secures the vein strip 100 to the outer surface of the body 102 of the training device 200 between two corresponding necks, such as for example the necks 224 and 230, as described herein above. The skin patch 252 is then positioned and secured over the tube 102 of the vein strip 100. The user then positions the training device 200, for example, in one of the user's hands. Alternatively, the user may position the training device 200, for example, on a table top or in his/her lap with one hand supporting the training device 200. Subsequently, using proper technique, the user holds the needle between his/her index finger and thumb and removes a safety cap from the needle. With the opposite hand, using his/her thumb and index finger, the user forms the letter "C" and positions his/her index finger over the selected simulated cardiovascular vein strip 100 and above the injection site, (this will keep the vein strip 100 from rolling while acting as a pressure point to slow blood loss from an actual needle insertion, once the needle is removed). Subsequently, the user positions his/her thumb below the injection site and applies a small amount of downward tension pulling the simulated skin patch 252 taunt. The thumb may also be used as a support for the needle to ensure a 45° angle.

Next, the user positions the needle at approximately a 45° angle with the bevel edge of the needle facing upward and slowly inserts the needle into the tube 102 of the vein strip 100. Due to the construction of the simulated cardiovascular vein strips 100, the user will feel a small amount of resistance as the needle advances through the simulated skin 252 and the wall of the tube 102. Once the needle is properly inserted, the user repositions his/her thumb to allow the needle to drop down to above the skin level. Next, the user slowly advances the needle approximately another ¼ of an inch into the tube 102. Without moving the needle, the user slowly advances the catheter into the tube 102. Next, while continuing to apply pressure with his/her index finger above the injection site, the user removes the needle, leaving the catheter in place.

As also discussed herein, the training device 200 can be utilized to simulate wet intravenous needle insertion. For example, in various embodiments, one or more of the simulated cardiovascular vein strips 100 can be filled with a liquid, as described above, and be utilized to practice inserting an IV needle and obtaining an actual "flash" of simulated blood in the needle chamber (or associated syringe) as the needle punctures the liquid-filled vein strip 100 during such training.

As also described above, the training device 200 can be utilized to perform needle decompression training. To perform such needle decompression training, the user places one of the closure devices 212 in the open position and removes the desired medical implement(s) 211, e.g., a decompression needle, a skin patch 252 and a clavicle subtissue simulation pad 262, from the interior chamber 210. In various implementations, the user can also inflate a small air sack described above and insert the air sack into the interior chamber 210 beneath the needle depression training slot 260. It is anticipated that training device 200 will already have the flesh pad 250 positioned about the center of the body 202 between the rings 220 and 222, and a clavicle subtissue simulation pad 262 positioned underneath the flesh pad 250 over the slot 260. If either of these items is not so positioned, the user must obtain the flesh pad 250 and/or the clavicle subtissue simulation pad 262, from within the cavity 210 or from another source, and place them appropriately on the body 202 as instructed herein. The user may then replace the closure device 212 over the annular ring 206 or 208 to close the training device 200. Next, the user completes all pre-execution checks of equipment and positions the training device 200, for example, in one of the user's hands. Alternatively, the user may position the training device 200, for example, on a table top or in his/her lap with one hand supporting the device. The user then identifies the proper insertion site between the two adjacent cardiovascular simulated vein strips 100 by using the vein strips 100 as guides, to simulate locating the middle of a human clavicle between the second and third ribs. The user then removes the safety cap from the 14 gauge needle and holds the needle at approximately a 90° angle to the injection site, i.e., above the needle depression training slot 260. Then, applying firm, but gentle, pressure the user advances the needle through the simulated skin patch 252, through the flesh pad 250 and through the clavicle subtissue simulation pad 262.

If the optional air sack mentioned above has been properly positioned under the slot 260 within the chamber 212, the decompression needle will burst the air sack and discharge a small amount of compressed air through the decompression needle to help indicate proper technique. The user continues to advance the needle until the catheter hub is against the simulated skin patch 252. Then, while holding the catheter needle in place, the user removes the needle, secures the catheter hub in place with tape and attaches a small flutter valve to the hub.

Of course, each of the techniques described herein are representative and the training device 200 is versatile. Hence, multiple variations to each training technique can be implemented using the training device 200.

The description herein is merely exemplary in nature and, thus, variations that do not depart from the gist of that which is described are intended to be within the scope of the teachings. Such variations are not to be regarded as a departure from the spirit and scope of the teachings.

For example, the training device 200 need not be required to have annular rings 220 and/or 222 to releasably hold vein strips 100 to the body 202. Rather, a wide variety of retaining structures can be designed to releasably hold the vein strips 100 to the side of the training device 200, including for example any one or more protrusions, ridges or lips, so long as the vein strip 100 is held in place by the tension induced in the tube 102 by placing the vein strip into the retaining structures. Further, it is contemplated that such retaining structures need not be fixed in place, such as the annular rings 220 and 222, but may be adjustable to accommodate a variety of different sized vein strips 100, having different lengths and/or other dimensions. Also, such variable retaining structures may be utilized to regulate the tension on the tube 102 of a vein strip 100 placed in such a retaining structure so as to enable a user to selectively simulate different types of natural veins, such as for example a static (i.e., tight) vein or a variety of rolling (i.e., loose) veins.

By way of further example, the training device 200 is not limited to having three pairs of necks 224 and 230, 226 and 232, and 228 and 234, to form three placement positions for the vein strips 100. Rather, the training device can have as few as one pair or two pairs, or many more than three, only limited by how many pairs will fit in a practical manner about the perimeter of the body 202 of the training device 200. Also, the pairs of necks 224 and 230, 226 and 232, and 228 and 234, do not need not be a uniform radial distance apart from one another. Rather, the pairs of necks may be spaced apart radially at varying or random distances. Similarly, the necks 224 and 230, 226 and 232, and 228 and 234 of each pair do not need to be a uniform distance apart from one another. That is, for example, the distance between the necks 224 and 230 may be different from the distance between the necks 226 and 232. In this way, the training device 200 can accommodate various sized vein strips 100. Alternately, the training device 200 can be so constructed to provide a variation in tension imparted the tube 102 of two or more vein strips 100 of the same length A that are placed between the necks 224 and 230 as opposed to between the necks 226 and 232 so as to simulate different types of natural veins, such as for example a static vein or a variety of rolling veins.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the representative embodiments and implementations described above without departing from the scope of the disclosure. Accordingly, all matter contained in the above description or shown in the accompanying drawings should be interpreted as illustrative and not in a limiting sense. That is, thee description of the embodiments as set forth herein, and as shown in the drawings, is provided for illustrative purposes only and, unless otherwise expressly set forth, is not intended to limit the scope of the claims, which set forth the metes and bounds of our invention.

It is further to be understood that the processes or steps described herein are not to be construed as necessarily requiring their performance in the particular order discussed or illustrated. It is also to be understood that additional or alternative processes or steps may be employed.

What is claimed is:

1. A simulated vein strip for attachment to a needle insertion training device, said training device comprising a body with a first attachment structure and a second attachment structure separated from the first attachment structure, said training device further having a training surface positioned between the first and second attachment structures, the simulated vein strip comprising:
   a. a flexible tube that is shaped and sized to substantially simulate a natural vein, said flexible tube having a first end with a first inner diameter and a second end with a second inner diameter opposite the first end, said first and second ends defining a length there between;
   b. a first coupler, said first coupler being attached to and closing the first end of the flexible tube, said first coupler being shaped and sized to releasably attach to the first attachment structure of the training device; and
   c. a second coupler, said second coupler being attached to and closing the second end of the flexible tube, said second coupler being shaped and sized to releasably attach to the second attachment structure of the training device;
   the length between the first and second ends of the flexible tube being predetermined to substantially extend the flexible tube across the training surface of the training device when the first and second couplers are attached to their respective attachment structures.

2. The simulated vein strip of claim 1, wherein the flexible tube is elastic and the length between the first and second ends of the flexible tube is predetermined to require the tube to elongate in order to create a tension in the tube when the first coupler attaches to the first attachment structure and the second coupler attaches to the second attachment structure, said tension maintaining the first coupler in attachment to the first attachment structure.

3. The simulated vein strip of claim 2, wherein where the first attachment structure comprises a first neck shaped and sized to allow at least a portion of the tube in proximity to the first end to fit through the first neck, the first coupler being shaped and sized such that it cannot fit entirely through the first neck.

4. The simulated vein strip of claim 3, wherein the first coupler comprises a plug positioned at least in part in the first end of the flexible tube, the plug closing the first end of the flexible tube and being shaped and sized such that it cannot fit entirely through the first neck.

5. The simulated vein strip of claim 4, wherein the plug comprises a head and a stem, the stem being shaped and sized to insert at least in part into the first end of the flexible tube so as to expand the first inner diameter, the head being shaped and sized to engage but not fit entirely through the first neck.

6. The simulated vein strip of claim 2, wherein where the first attachment structure comprises a protuberance and the first coupler is shaped and sized to releasably attach to the protuberance.

7. The simulated vein strip of claim 6, wherein the first coupler comprises a hook, an eyelet or a cup.

8. The simulated vein strip of claim 1, further comprising one or more colors, each of said one or more colors corresponding to one or more of the following features of the simulated vein:
   a. a configuration adapted for a particular needle insertion training device model;
   b. the simulated vein strip being empty inside;
   c. the simulated vein strip having fluid inside;
   d. the simulated vein strip having a particular outer diameter;
   e. the simulated vein strip having a particular wall thickness;
   f. the simulated vein strip having a particular material toughness; and/or
   g. the simulated vein strip having a particular length.

9. The simulated vein strip of claim 1, further comprising a fluid housed within the tube.

10. The simulated vein strip of claim 1, wherein the flexible tube is shaped and sized to substantially replicate a predetermined variety of natural vein.

11. The simulated vein strip of claim 1, having a flexible tube length is such that when the first coupler attaches to the first attachment structure and the second coupler attaches to the second attachment structure, the flexible tube substantially replicates a generally static vein.

12. The simulated vein strip of claim 1, wherein the flexible tube length is such that when the first coupler attaches to the first attachment structure and the second coupler attaches to the second attachment structure, the flexible tube substantially replicates a rolling vein.

13. A simulated vein system for a needle insertion training device comprising:
   a. a training device comprising a body having a first attachment structure and a second attachment structure separated from the first attachment structure by a first distance, the training device having a training surface positioned between the first and second attachment structures; and
   b. a simulated vein strip comprising a flexible tube that is shaped and sized to substantially simulate a natural vein, the vein strip having a first closed end shaped and sized to releasably attach to the first attachment structure and a second closed end shaped and sized to releasably attach to the second attachment structure, the flexible tube being positioned between the first and second closed ends, the vein strip having a first length that is predetermined to position the flexible tube over the training surface of the training device when the first closed end is attached to the first attachment structure and the second closed end is attached to the second attachment structure.

14. The simulated vein system of claim 13, wherein the flexible tube is elastic and the first length is predetermined such that the flexible tube elongates to create a desired tension in the tube when the first end attaches to the first attachment structure and the second end attaches to the second attachment structure, the tension maintaining the first end in attachment to the first attachment structure.

15. The simulated vein system of claim 13, wherein the first attachment structure comprises a neck shaped and sized to allow at least a portion of the flexible tube in proximity to the first end to fit through the neck, the first end being shaped and sized such that it cannot fit entirely through the neck.

16. The simulated vein system of claim 13, wherein the first attachment structure comprises a protuberance and the first end is shaped and sized to releasably attach to the protuberance.

\* \* \* \* \*